May 5, 1959     R. J. SPERCEL     2,884,703

GAUGE FOR CIRCULAR FORM TOOLS

Filed March 6, 1956

INVENTOR.
ROBERT J. SPERCEL
BY
ATTORNEYS

2,884,703

GAUGE FOR CIRCULAR FORM TOOLS

Robert J. Spercel, Cleveland, Ohio

Application March 6, 1956, Serial No. 569,829

1 Claim. (Cl. 33—201)

The present invention relates to gauges and more particularly to gauges used with circular form tools for automatic screw machines and the like.

The principal object of the invention is the provision of a novel and improved gauge for use in checking or inspecting the rake angle of a circular form tool which gauge will be compact, simple and inexpensive in construction, and easy to use and manipulate and which can be assembled with the tool during grinding and moved relative thereto, even though the tool be clamped in a vise or other fixture.

A more specific object of the invention is the provision of a novel and improved gauge of the inspection type for checking the accuracy of the rake angle of a circular form tool and which gauge comprises a plate-like member having means pivotally connected thereto for detachably assembling it with a circular form tool with the axis of said pivotal connection concentric with the axis of the tool and one or a plurality of linear or straight gauging edges disposed generally normal to the axis of the said pivotal connection but offset to one side thereof.

The invention resides in certain constructions, combinations and arrangements of parts and further objects and advantages will be apparent from the following description of the preferred embodiment described with reference to the accompanying drawings forming a part of this specification in which similar reference characters designate corresponding parts, and in which Fig. 1 is a perspective view of an inspection gauge embodying the present invention assembled with a circular form tool;

Figure 1:
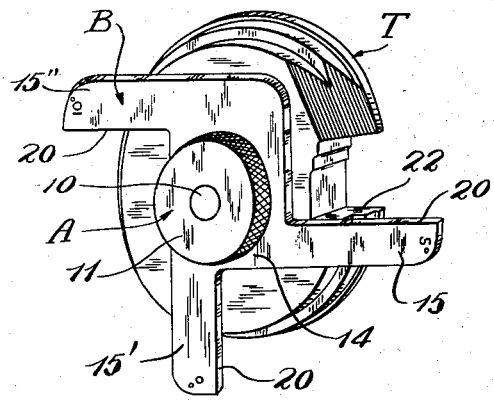
Figure 2:
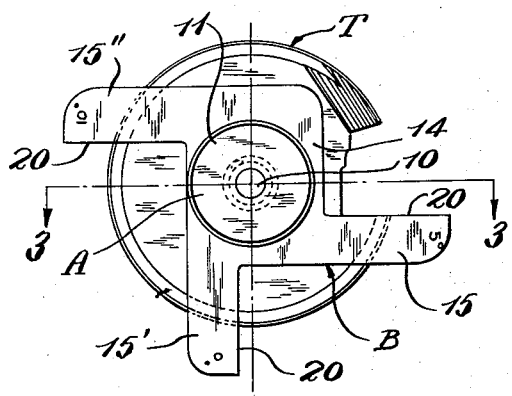
Fig. 2 is a planed view of the gauge and tool shown in Fig. 1.
Figure 3:
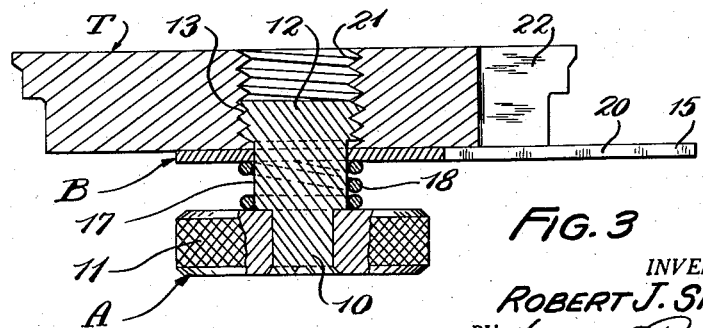
Fig. 3 is a sectional view, with portions in elevation, approximately on the line 3—3 of Fig. 2.

Referring to the drawing, the gauge shown therein comprises a spindle or hub-like member, designated generally by the reference character A and comprising a shank 10 having a knurled head 11 fixedly secured to one end and a threaded boss 12 at the opposite end. In addition to the spindle member A, the gauge comprises a base plate or plate-like member B having a body portion 14 and one of a plurality of generally radial arms 15, 15', 15". The body portion 14 of the plate B is provided with a generally central aperture through which the shank 10 of the spindle member A projects. The diameter of the threads 13 on the boss 12 is greater than the shank portion 17 intermediate the threads 13 and the head 10 and the diameter of the aperture in the body portion 14 of the plate B, which aperture is slightly larger than the unthreaded portion 17 of the shank 10. A spring 18 which may be either of the coil type as shown or any other suitable type is interposed between the head 11 of the spindle member A and the body portion 14 of the plate B which spring prevents free rotation of the member B upon the shank 10 of the spindle member A. The head 11 of the spindle member A is made separate from the shank 10 so as to permit assembly of the plate member B and the spring 18 on the shank. After the plate member B and the spring 18 are assembled on the shank 10 the two parts 10 and 11 are either detachably fixed or secured together to provide a unitary structure.

The radial arm or arms 15, 15', 15" each comprise a linear or straight gauging edge 20 extending generally radially of the axis of the spindle member A but offset slightly to one side thereof. More specifically, the gauging edge or line 20, preferably, lies in a plane normal to the axis of the spindle member and in a second plane parallel with but offset from said axis. Where more than one arm is employed the gauging edges of the respective arms are preferably offset different amounts with respect to radial planes through the axis of the spindle parallel to the respective edges, or, in other words, from the axis of the spindle member A and in turn the tool with which it is used. The different amounts of offset preferably correspond to different standard offsets of cutting surfaces of tools from radial planes thereof, and in turn to different rake angles employed with respective cutting tools. The respective arms 15, 15', 15" are provided with suitable indicia.

The gauge shown is adapted to be used with a circular form tool similar to that shown in the drawings and designated T. The tool T has a tapped or threaded central aperture 21 and, in use, the threaded portion of the shank of the spindle member A is screwed into the threaded aperture of the tool but not far enough to prevent rotation of the plate B relative thereto and to the tool. Thereafter the plate B is rotated to align the desired gauging edge 20 with the face 22 of the tool and the face checked thereagainst or compared therewith for accuracy, etc. If the face of the tool requires grinding the plate member B can be rotated slightly to move the radial arm away from the tool face and the tool ground while the gauge remains assembled with it. To provide clearance in front of the gauge edge and thus permit grinding of the tool without removal of the gauge, the body portion 14 of the plate B is relieved in front of the gauge edge or edges so as to provide an opening sufficient to permit grinding of the tool without the gauge interfering with the wheel.

As will be readily apparent from the foregoing description of the preferred embodiment, the tool and gauge may be clamped in a vise or other suitable fixture during the grinding operation, without preventing rotation of the plate member B relative to the spindle or hub A and the tool, by engaging the head 11 of the gauge and the opposite side of the tool T between the jaws of the vise or fixture. This permits gauging or checking of the tool without unclamping the tool and gauge.

As previously stated, the gauge of the preferred embodiment is adapted for use with a circular form tool having a threaded central aperture. The invention, however, is not limited to the preferred embodiment shown and abutment means on the shank 10 other than the threads 13 may be employed for engaging the tool and limiting linear movement of the spindle member of the gauge into the tool. A gauge, for example, having an unthreaded cylindrical shank may be used by providing the shank with a suitable shoulder for engagement with the side face of the tool adjacent to which the gauge is applied and having the plate member B rotatable therebetween and the head of the spindle member.

Although in the preferred embodiment shown only one side, or edge, designated 20 of each of the arms 15, 15', 15" is referred to as a gauging edge it is to be understood that opposite sides or edges of the arms may be used as gauging edges and that any number of arms may be employed, as desired.

While the preferred embodiment of the invention has been described in considerable detail, the invention, as previously stated, is not limited to the particular construction shown which may be varied within the scope of this invention and it is my intention to hereby cover all adaptations, modifications and uses thereof which come within the practice of those skilled in the art to which the invention relates and the scope of the appended claim.

Having thus described my invention, I claim:

In an inspection gauge of the character referred to a spindle member having a boss adjacent to one end adapted to be inserted in a central aperture in a circular form tool and means engaging the tool for limiting linear axial movement of said spindle member relative to the tool in one direction, a head adjacent to the end of said spindle member opposite to said boss, and a one-piece plate rotatably connected to said spindle member intermediate said boss and said head for rotation about an axis normal to the plane of said plate and concentric with the axis of said boss, said plate having a gauging surface disposed in a line offset from said axis and adapted when said gauge is assembled with a circular form tool to traverse the circumference of the tool.

References Cited in the file of this patent
UNITED STATES PATENTS

| | | |
|---|---|---|
| 919,786 | Simmons | Apr. 27, 1909 |
| 1,240,074 | Martin | Sept. 11, 1917 |
| 1,814,266 | Stauder | July 14, 1931 |
| 2,455,464 | Bartell | Dec. 7, 1948 |
| 2,527,189 | Kittelson | Oct. 24, 1950 |
| 2,608,764 | Somma et al. | Sept. 2, 1952 |

UNITED STATES PATENT OFFICE
CERTIFICATE OF CORRECTION

Patent No. 2,884,703

May 5, 1959

Robert J. Spercel

It is hereby certified that error appears in the printed specification of the above numbered patent requiring correction and that the said Letters Patent should read as corrected below.

Column 3, line 14, for "in", first occurrence, read -- into --; line 15, after "means" insert -- adjacent to said boss for --; line 15, for "for limiting" read -- to limit --; line 17, for "one" read -- the --; line 17, after "direction" and before the comma insert -- in which said spindle member is moved to insert said boss into the central aperture in the tool --; column 4, line 2, for "boss" read -- means --.

Signed and sealed this 19th day of April 1960.

(SEAL)
Attest:

KARL H. AXLINE
Attesting Officer

ROBERT C. WATSON
Commissioner of Patents